Patented May 15, 1934

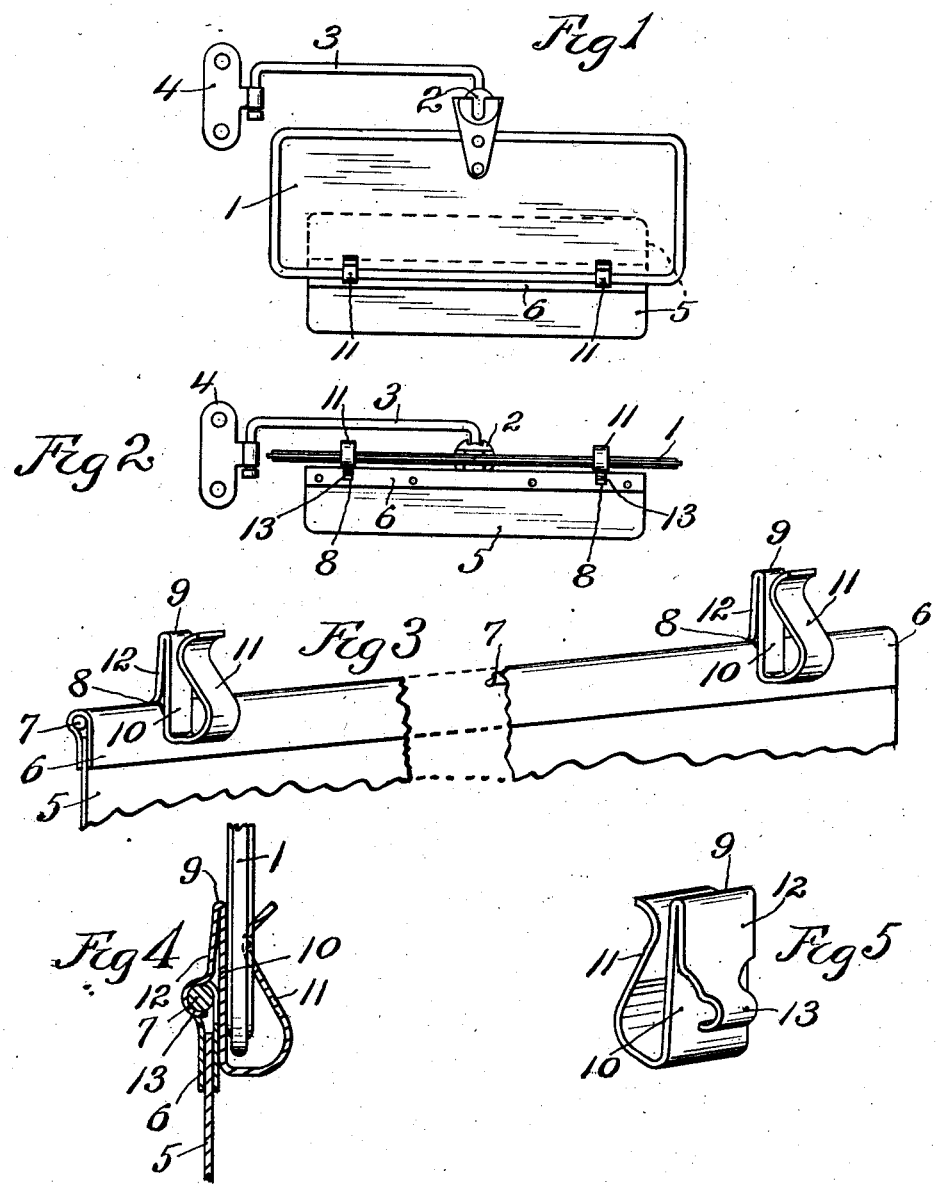

1,958,934

UNITED STATES PATENT OFFICE 1,958,934

GLARE SHIELD MECHANISM

Harold E. Williams, Carthage, Mo.

Application May 28, 1932, Serial No. 614,156

2 Claims. (Cl. 296—97)

My invention relates to improvements in glare shield mechanism. It relates particularly to a novel glare shield mechanism adapted for use in connection with a type of visor installed in a car at the rear of the windshield.

One object of my invention is to provide novel means by which a glare shield may be quickly attached to or detached from a visor; which enables the glare shield to be easily and quickly adjusted to an operative position depending below the visor, or to be disposed flatwise against the visor, when not needed; which provides novel means for yieldingly holding the glare shield in the position to which it is adjusted, which is simple, cheap, durable, not likely to get out of order, and which is efficient in operation.

My invention provides further a novel spring clip adapted for quick releasable attachment to a visor and for pivotally supporting a glare shield on the visor and yieldingly holding the glare shield in the position to which it may be swung.

The novel features of my invention are hereinafter fully described and claimed.

In the accompanying drawing, which illustrates the preferred embodiment of my invention, Fig. 1 is an elevation, looking from the driver's seat of a visor of usual inside type, shown supporting my improved glare shield mechanism, the visor being shown depending and the glare shield shown in solid lines in the depending operative position.

Fig. 2 is a view similar to Fig. 1, the visor being shown in the horizontal position, and the glare shield depending therefrom.

Fig. 3 is an enlarged perspective, partly broken away of my improved glare shield mechanism.

Fig. 4 is an enlarged view showing a part of the glare shield and the clip in cross section and a part of the visor in end elevation.

Fig. 5 is an enlarged perspective of one of the spring clips.

Similar characters of reference designate similar parts in the different views.

1 designates a rectangular opaque visor of usual type supported by a universal joint 2 from a horizontal bar 3 pivoted on a vertical axis on a bracket 4, which is usually fastened to the inner side of a car body adjacent to one end and upper edge of the windshield.

My improved glare shield mechanism comprises a translucent glare shield body 5, of celluloid, glass or other suitable material, the shape of which is preferably substantially rectangular, and which has its upper longitudinal edge portion embraced by and fastened to an inverted metal channel 6 in which is rigidly fastened a rod 7, which extends across two notches 8 in the upper edge of the channel 6, the portions of the rod 7 which bridge the notches 8 providing bearing portions adapted for pivotal engagement respectively with two supporting spring clips 9, each of which has means for releasably embracing and being supported by the visor 1.

Each clip 9 has a middle portion 10, and two resilient arms 11 and 12, which extend respectively in opposite directions from opposite ends of the middle portion 10. The clips 9 are alike in structure and function, so that a description of one will suffice for each.

The middle portion 10 and the arm 11 are adapted to be sprung apart so as to receive between them the lower edge portion of the visor 1, which they clamp with a yielding pressure, whereby the clip is releasably supported by the visor.

The free end of the arm 12 is provided with an arcuate portion 13, having its concave side next to the middle portion 10. The portion 13 is disposed in one of the notches 8 and bears tightly against the rod 7.

The middle portion 10 bears against the adjacent side of the channel 6, and with the arm 12 and rod 7, holds the glare shield yieldingly in the position with which it may be swung in the clip, due to the frictional engagement of the arcuate portion 13 and the rod 7.

To attach the glare shield to the visor 1 it is but necessary to slip the lower longitudinal portion of the visor between the clamping arms 11 and the middle portions 10 of the clips 9.

When the visor is depending, as shown in Fig. 1, and it is desired to use the glare shield 5, the latter is disposed in the depending position, shown in solid lines in Fig. 1. If it is desired to raise the glare shield out of the range of vision, it is swung upwardly flatwise against the visor 1, as shown in dotted lines in Fig. 1.

If the visor is to be disposed in the horizontal position, shown in Fig. 2, and the glare shield is to be used, the latter is swung to the depending position, shown in Fig. 2.

In these different positions of the glare shield 5 it is yieldingly held by reason of the frictional pressing engagement of the portions 13 against the rod 7.

To detach the glare shield mechanism from the visor 1, it is but required to pull the glare shield so as to disengage the clips 9 from the visor.

For easy insertion of the visor between the arms 11 and the portions 10 of the clips, the free ends of the arms 11 are outwardly curved, as shown.

When neither the visor nor the glare shield are to be used, the glare shield 5 is swung to the flatwise position against the visor 1, and the latter is swung to the horizontal position, shown in Fig. 2.

Various modifications of my invention, within the scope of the appended claims, may be made without departing from the spirit of my invention.

What I claim is:—

1. In a glare shield mechanism, the combination with a visor pivoted at its upper edge portion to swing from a vertical to a horizontal position, of a glare shield, and a spring clip having an upwardly facing U shaped portion clampingly engaging the lower edge portion of said visor, and having a downwardly facing U shaped portion, one arm of each of said U shaped portions being intermediate and common to both of said U shaped portions, said downwardly facing U shaped portion having an arm shorter than said intermediate portion and pivoted to the upper edge portion of said shield so that the latter may be swung from a vertical position extending below said visor to an upper vertical position at one side of said visor, said shorter arm exerting a pressure holding said glare shield against said intermediate portion in both of said vertical positions of said glare shield.

2. In a glare shield mechanism, the combination with a visor pivoted at its upper edge portion to swing from a vertical to a horizontal position, of a glare shield, and a spring clip having an upwardly facing U-shaped portion clampingly engaging the lower edge portion of said visor, and having a downwardly facing U shaped portion, one arm of each of said U-shaped portions being intermediate and common to both of said U-shaped portions, said downwardly facing U-shaped portion having an arm pivoted to the upper edge portion of said shield so that the latter may be swung from a vertical position extending below said visor to an upper vertical position at one side of said visor, said last named arm exerting a pressure holding said glare shield against said intermediate portion in both of said vertical positions of said glare shield.

HAROLD E. WILLIAMS.